United States Patent
Yasukaga

(10) Patent No.: US 9,785,103 B2
(45) Date of Patent: Oct. 10, 2017

(54) IMAGE FORMING SYSTEM INCLUDING PLURAL IMAGE FORMING APPARATUSES TANDEM-ARRANGED IN SERIES AND WHICH DISPLAY INFORMATION BASED ON CONNECTING POSITIONS THEREOF

(75) Inventor: Masayuki Yasukaga, Hachioji (JP)

(73) Assignee: KONICA MINOLTA BUSINESS TECHNOLOGIES, INC., Tokyo (JP)

(*) Notice: Subject to any disclaimer, the term of this patent is extended or adjusted under 35 U.S.C. 154(b) by 50 days.

(21) Appl. No.: 13/303,556

(22) Filed: Nov. 23, 2011

(65) Prior Publication Data

US 2012/0140271 A1    Jun. 7, 2012

(30) Foreign Application Priority Data

Dec. 1, 2010 (JP) .................. 2010-268271

(51) Int. Cl.
*G06K 15/00* (2006.01)
*G03G 15/00* (2006.01)
(Continued)

(52) U.S. Cl.
CPC ......... *G03G 15/502* (2013.01); *H04N 1/0044* (2013.01); *H04N 1/00278* (2013.01); *H04N 1/00347* (2013.01); *H04N 1/00411* (2013.01); *H04N 1/00424* (2013.01); *H04N 1/00474* (2013.01); *H04N 1/00477* (2013.01); *H04N 1/00482* (2013.01); *H04N 1/00503* (2013.01);
(Continued)

(58) Field of Classification Search
CPC ........ G06F 3/14; G06F 3/1204; G06F 3/1207; G06F 3/1291; G06F 3/1259; G03G 15/5016; G03G 2215/00021; G03G 15/502; G03G 15/00021; H04N 2201/0036; B65H 2402/10; B65H 2405/15; B65H 2601/11; B65H 2001/324; B65H 3/44
USPC .................... 358/1.15; 271/109, 163; 399/21
See application file for complete search history.

(56) References Cited

U.S. PATENT DOCUMENTS

| | | | | |
|---|---|---|---|---|
| 8,090,882 B2* | 1/2012 | Yoshida | ......................... | 358/1.15 |
| 2003/0151764 A1* | 8/2003 | Uchida | .................. | G03G 15/70 |
| | | | | 358/1.14 |

(Continued)

FOREIGN PATENT DOCUMENTS

| | | |
|---|---|---|
| JP | 11-313181 A | 11/1999 |
| JP | 2000-32186 A | 1/2000 |

(Continued)

OTHER PUBLICATIONS

Japanese Office Action dated Feb. 25, 2014 (and English translation thereof) in counterpart Japanese Application No. 2010-268271.

Primary Examiner — Benny Q Tieu
Assistant Examiner — Juan M Guillermety
(74) Attorney, Agent, or Firm — Holtz, Holtz & Volek PC

(57) ABSTRACT

An image forming system including plural image forming apparatuses, being tandemly-arranged, and forming an image while assigning an area of a recording sheet, wherein each individual image forming apparatus including a display section which is configured to display various information and a control section which is configured to detect connecting positions of each individual image forming apparatus in the image forming system, and to control each individual display section to display a typical information based on detected results.

14 Claims, 11 Drawing Sheets

(51) Int. Cl.
*H04N 1/00* (2006.01)
*H04N 1/23* (2006.01)
*H04N 1/32* (2006.01)

(52) U.S. Cl.
CPC ......... *H04N 1/2346* (2013.01); *H04N 1/2392* (2013.01); *H04N 1/32635* (2013.01); *H04N 1/32657* (2013.01); *G03G 2215/00021* (2013.01); *H04N 2201/0036* (2013.01); *H04N 2201/0056* (2013.01); *H04N 2201/0094* (2013.01)

(56) References Cited

U.S. PATENT DOCUMENTS

| | | | |
|---|---|---|---|
| 2005/0271400 A1* | 12/2005 | Okamoto | G03G 15/70 399/21 |
| 2006/0007475 A1* | 1/2006 | Sato et al. | 358/1.15 |
| 2006/0274362 A1* | 12/2006 | Kita | 358/1.15 |
| 2008/0063424 A1* | 3/2008 | Tanaka | G03G 15/5079 399/79 |
| 2008/0230982 A1* | 9/2008 | Kosugi | B65H 3/44 271/163 |
| 2010/0033758 A1* | 2/2010 | Sakuraba | 358/1.15 |
| 2011/0211003 A1* | 9/2011 | Kusakabe | 347/14 |
| 2011/0217089 A1* | 9/2011 | Hotokeishi | G03G 15/01 399/301 |

FOREIGN PATENT DOCUMENTS

| | | |
|---|---|---|
| JP | 2006-340259 A | 12/2006 |
| JP | 2007-240697 A | 9/2007 |

\* cited by examiner

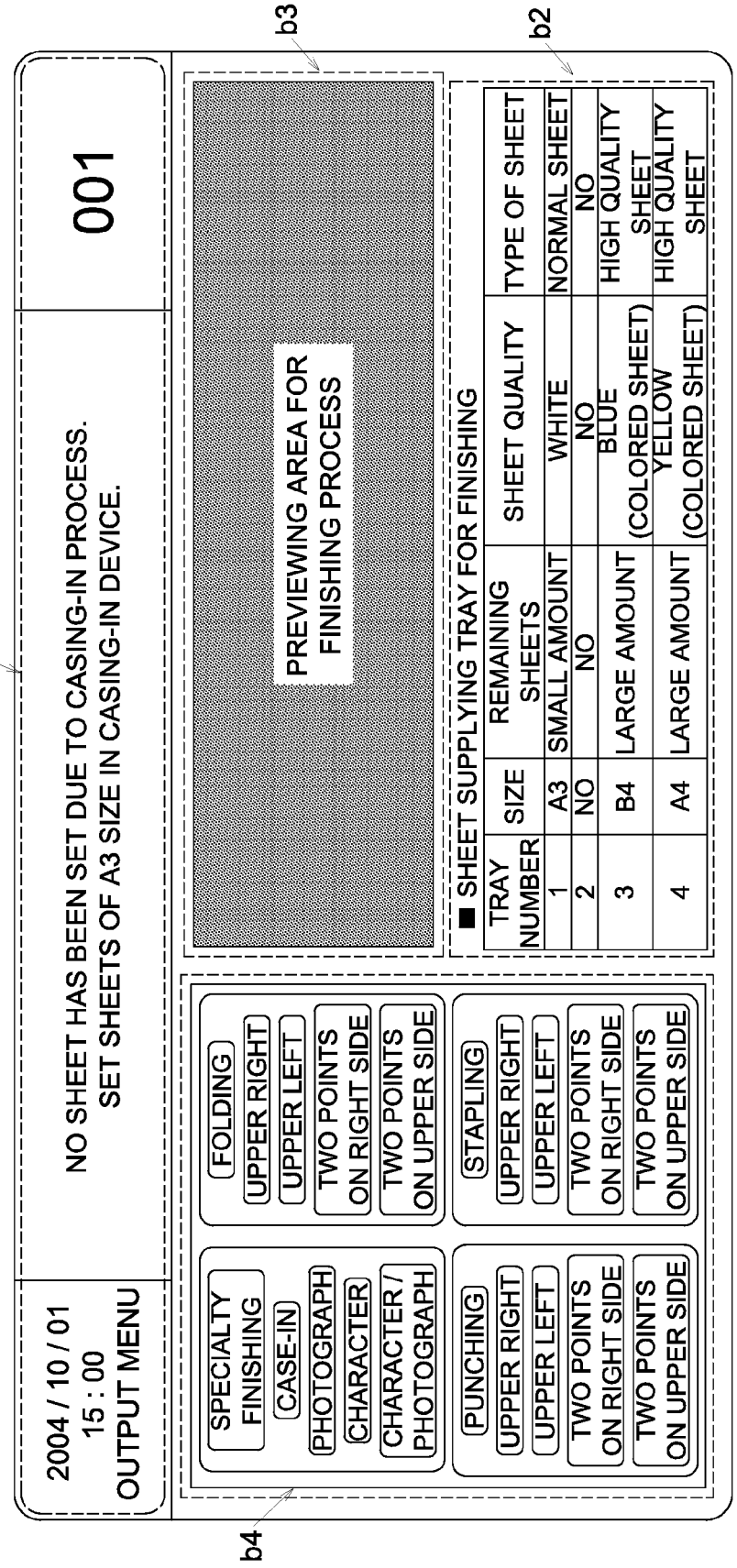

IMAGE FORMING SYSTEM INCLUDING PLURAL IMAGE FORMING APPARATUSES TANDEM-ARRANGED IN SERIES AND WHICH DISPLAY INFORMATION BASED ON CONNECTING POSITIONS THEREOF

CROSS REFERENCE TO RELATED APPLICATION

This application is based on Japanese Patent Application No. 2010-268271 filed on Dec. 1, 2010, with the Japanese Patent Office, the entire content of which is hereby incorporated by reference.

TECHNICAL FIELD

The present invention relates to an image forming system in which plural image forming apparatuses are arranged in series, being able to form images while assigning image forming areas on the front side or the reverse side of a recording sheet, or assigning areas within a single side of the recording sheet, and relates to image forming apparatuses to be used in said system.

BACKGROUND ART

There have been image forming systems in which plural image forming apparatuses are tandemly-arranged, that is, one image forming apparatus forms an image on a partial area of a recording sheet, and then said recording sheet is introduced to other image forming apparatus, whereby another image is formed on the remaining area of the recording sheet by said other image forming apparatus.

According to said image forming systems, one of two image forming apparatuses can form an image on the front side, and another image forming apparatus can form an image on the reverse side, so that said systems can form images at high speed on both sides, which is advantageous. Further, said two apparatuses form images, while using different colored toner. Still further, one image forming apparatus forms an image on a character forming area, while the other image forming apparatus forms an image on a picture forming area, that is, both apparatuses can form images using their assigned image forming areas, whereby very precise image formation can be conducted.

Said image forming systems, using plural image forming apparatuses, have been detailed in Patent Documents listed below.
Patent Document 1: JPA 2000-32186
Patent Document 2: JPA 2006-340259
Patent Document 3: JPA H11-313181

According to an image forming system disclosed in Patent Document 1, said image forming system includes a printing device with which a scanning device is combined, so that an operation section of each device is independently used at the same time. Accordingly, said system does not include plural image forming apparatuses, being the same kind of apparatuses, to be combined with each other.

According to an image forming system disclosed in Patent Document 2, said image forming system includes plural image forming apparatuses to be combined with each other, whereby one image forming apparatus has a display screen on which plural reduced-size images, displayed on display screens of other image forming apparatuses, are totally arranged. However, said display screen has problems with visibility. Further, said display screen displays the same portions, which is wasteful. As a result, said image forming system cannot offer adequate information, and cannot determine situations of the plural image forming apparatuses, which is a problem.

According to an image forming system disclosed in Patent Document 3, said image forming system obtains the status from other image forming apparatuses, and displays said status. However, said image forming system cannot show adequate information, and cannot comprehend situations of the plural image forming apparatuses, which is a problem.

Further, according to current image forming systems, in which plural image forming apparatuses are tandemly-arranged, said system uses an operation display section of a master image forming apparatus, to control other image forming apparatuses, being slave image forming apparatuses. In this case, the total operational inputs and conditional displays are conducted through the operation display section of the master image forming apparatus, while the operation display sections of the slave image forming apparatuses are not used. Accordingly, as the total image forming system, said image forming system cannot show adequate information, and cannot comprehend situations of the plural image forming apparatuses, which is a problem.

As detailed above, if the image forming system cannot show adequate information, and cannot comprehend situations of the plural image forming apparatuses, operations of plural image forming apparatuses become unclear, which is a major problem.

The present invention has been achieved to overcome the above problems. An object of the present invention is to realize an image forming system and image forming apparatuses which are tandemly-arranged, being able to form images while dividing areas on the front side or the reverse side or on a single side, of a recording sheet, whereby conditions of plural image forming apparatuses in the image forming system are easily obtained, and said image forming apparatuses are easily operated.

SUMMARY OF THE INVENTION

To achieve the abovementioned object, an image forming system reflecting one aspect of the present invention includes plural image forming apparatuses, being tandemly-arranged, to be able to assign areas of a recording sheet, wherein each of said plural image forming apparatuses include:

a display section which is configured to display various information; and a control section which is configured to detect connecting positions of each image forming apparatus within the image forming system, and to control the display section to display typical information based on detected results.

Detection of the connecting position is judged after information, regarding whether a tandem-connection exists or not, is obtained. If a tandem-connection exists, the combined position can be obtained, based on detailed information sent from other image forming apparatuses.

The control sections can obtain the connecting positions of each image forming apparatus via the communication sections, and a sensor can be mounted on the connecting positions.

In case that the sensor is used for detection, one image forming apparatus represents an upstream apparatus, another image forming apparatus is determined as a downstream apparatus, based on signals sent from the mounted sensors.

If more than three image forming apparatuses are connected in series, the connecting positions are detected by the electrical communications.

BRIEF DESCRIPTIONS OF THE DRAWINGS

Embodiments will now be detailed, by way of example only, with reference to the accompanying drawings which are meant to be exemplary, not limiting, and wherein like embodiments are numbered alike in the several figures, in which:

FIGS. 7a and 7b show examples of the image display, shown by the image forming apparatus relating to the embodiment of the present invention.

DETAILED DESCRIPTIONS OF THE PREFERRED EMBODIMENTS

Figure 1:
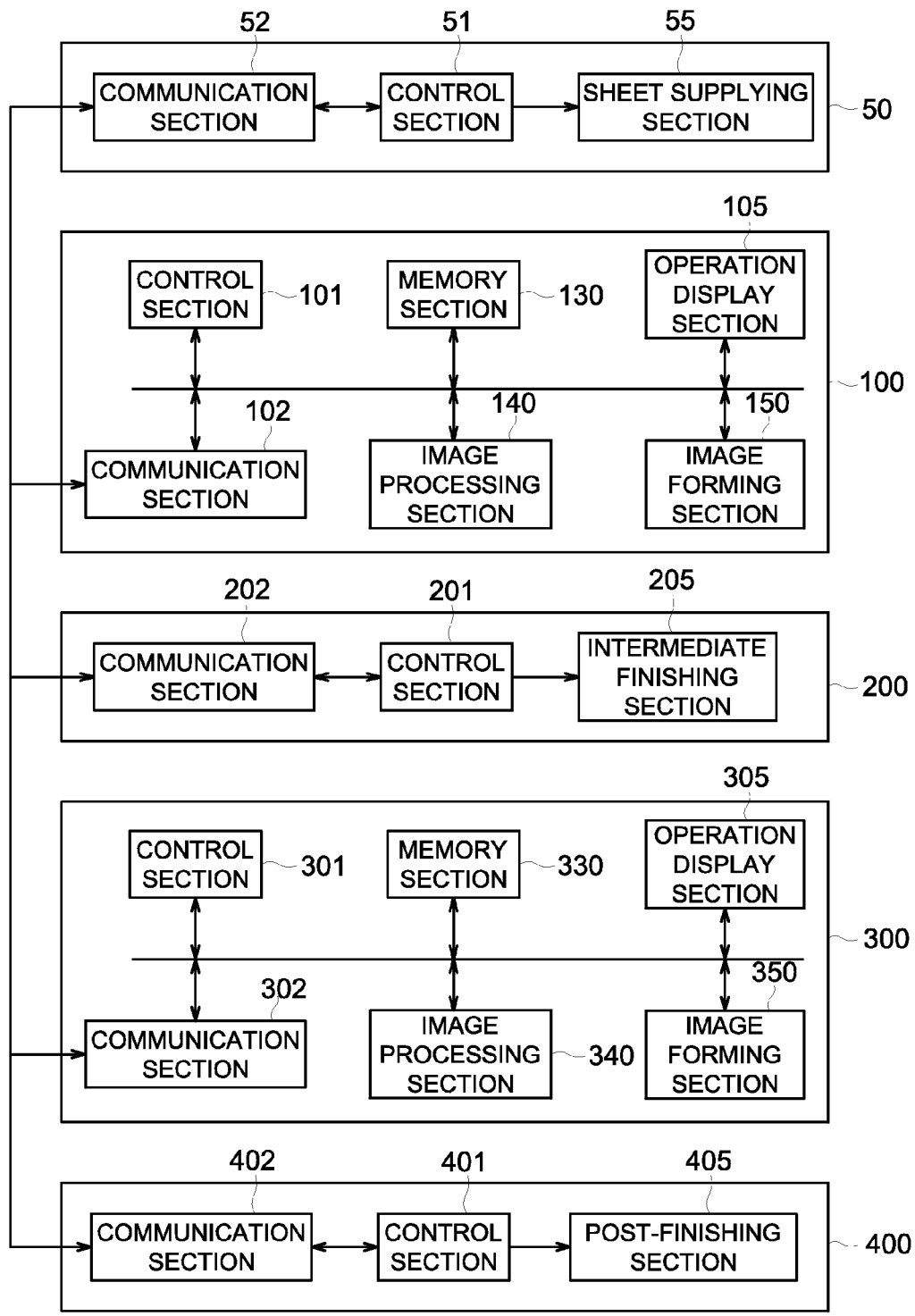
FIG. 1 is a block diagram to show a structure of an image forming apparatus relating to an embodiment of the present invention.

The embodiments of the present invention will now be detailed while referring to the drawings.

An image forming system and image forming apparatuses used in the same system will now be detailed, wherein plural image forming apparatuses are tandemly-arranged in series so that each image forming apparatus can divide an image forming operation to form an image on an area on the front side or the reverse side of a recording sheet, or in any area within a single side of the recording sheet.

[Structures of Image Forming Apparatus and Image Forming System]

Figure 2A:
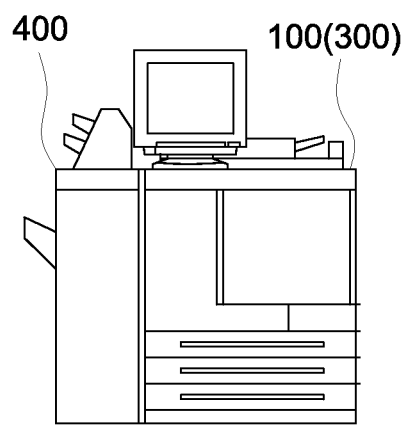
FIGS. 2a, 2b and 2c show various structures of the image forming apparatuses, relating to the embodiment of the present invention.
Figure 2B:
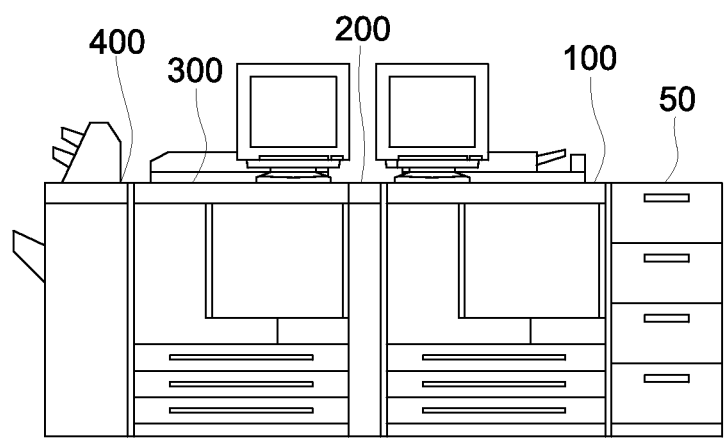
Figure 2C:
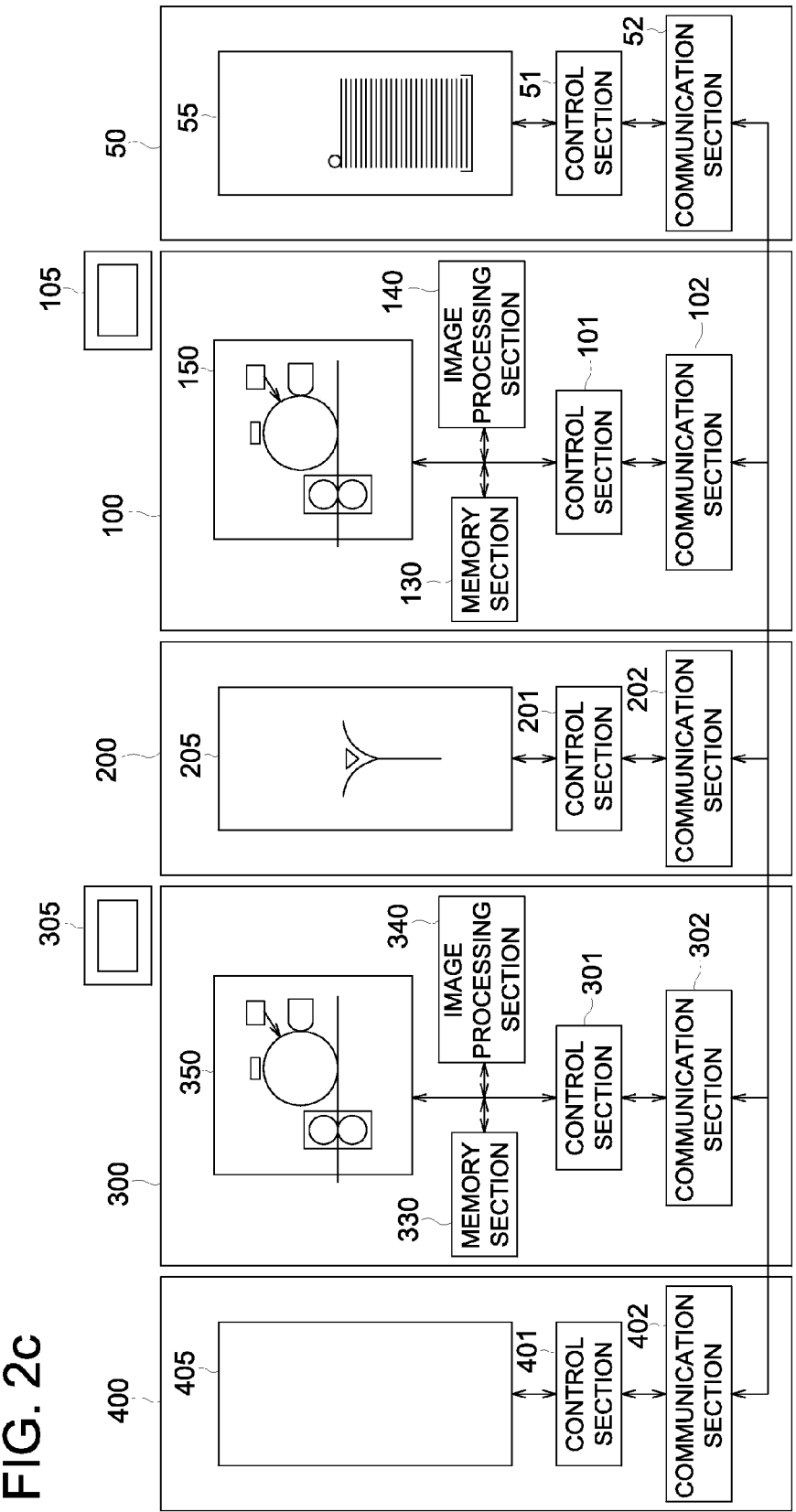
Figure 3:
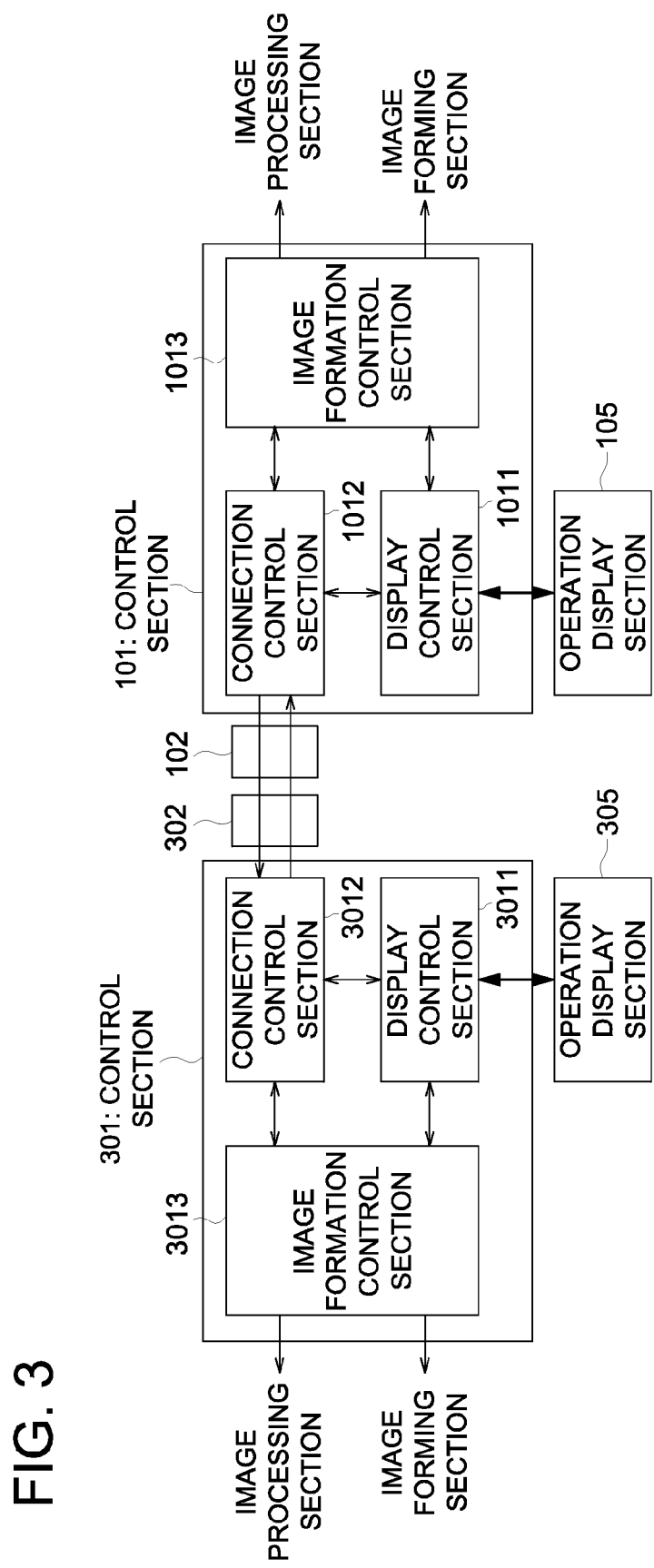
FIG. 3 is a block diagram to show relationships of control sections of the image forming apparatus relating to the embodiment of the present invention.

While referring to FIGS. 1 to 3, an image forming system will be detailed, in which image forming apparatuses 100 and 300 are tandemly-arranged in series, so that said apparatuses 100 and 300 can form images, while assigning an image forming area on the front side or the reverse side, or an area within a single side of a recording sheet.

In this explanation, image forming apparatus 100 and image forming apparatus 300 are arranged in series. However, image forming apparatuses, being more than three sets, can also be arranged in series.

That is, image forming apparatuses 100 and 300 can be used individually as shown in FIG. 2a, in which, post finishing device 400 is combined with either image forming apparatus 100 or 300, so that image forming apparatus 100 or 300 can be used individually.

Further, as shown in FIGS. 2b and 2c, an image forming system includes a tandem-arranged image forming apparatuses 100 and 300. Said image forming apparatuses 100 and 300 are arranged in series along the conveying route of a recording sheet. Image forming apparatus 100, serving as a pre-positioned apparatus, forms an image on an area of a recording sheet. Said recording sheet is subsequently introduced into image forming apparatus 300, serving as a post-positioned apparatus. Image forming apparatus 300 forms an image on another area of said recording sheet.

In this system, various apparatuses and devices are arranged in series, such as:

sheet supplying device 50 to supply recording sheet on which an image is to be printed;

image forming apparatus 100 to form an image on an assigned area which is the front side or the reverse side of the recording sheet, supplied from sheet supplying device 50;

intermediate finishing device 200 to conduct intermediate processes such as a reversing operation of a sheet carrying an image formed by image forming apparatus 100, and to supply said reversed sheet to image forming apparatus 300, serving as the post-positioned image forming apparatus;

image forming apparatus 300 to form an image on an assigned area which is the front side or the reverse side of the recording sheet, conveyed from intermediate finishing device 200; and post finishing device 400 to conduct various post finishing processes, such as a hole punching process, a stapling process, and a binding process, on the recording sheet carrying the images formed by image forming apparatuses 100 and 300.

According to the image forming system detailed above, intermediate finishing device 200 is arranged in midstream of the system, and reverses the recording sheet, so that image forming apparatuses 100 and 300 can form an image on the front side and the reverse side individually, which results in high speed image formation.

Instead of dividing image formation into the front side and the reverse side of a recording sheet, image forming apparatuses 100 and 300 can divide image formation into an upper half and a lower half of the same page of a recording sheet, or divide it into a left half and a right half of a recording sheet, respectively. Further, image forming apparatuses 100 and 300 can divide image formation into image formation for a normal color and image formation for a specific color, within the same page, respectively. Still further, image forming apparatuses 100 and 300 can divide image formation into monochromatic image formation, such as character formation, and gray-scale image formation, within the same page.

Apparatuses in the tandem method image forming system will now be detailed, while referring to FIGS. 1 and 2. In this system, image forming apparatus 100 serves as a master apparatus, while image forming apparatus 300 serves as a slave apparatus. However, it is also possible to operate the system in such way that image forming apparatus 100 serves as a slave apparatus, while image forming apparatus 300 serves as a master apparatus. Further, though there are the master apparatus and the slave apparatus in this system, image forming apparatus 100 can fundamentally be the same type with image forming apparatus 300, to structure the system as a stand-alone apparatus.

Sheet supplying device 50 is structured of:

control section 51 to control various sections of the sheet supplying device;

communication section 52 to communicate with image forming apparatus 100 to which the recording sheet is to be conveyed; and sheet supplying section 55 to supply a recording sheet at predetermined timing, which is generated by image forming apparatus 100.

Image forming apparatus 100 is structured of:

control section 101 to control various sections of image forming apparatus 100, and to control the total system of an image forming system;

communication section 102 to communicate with other connected devices;

operation display section 105 to receive indications inputted by a user and to display conditions of image forming apparatus 100;

memory section 130 to store image data for image formation and to store other various data;

image processing section 140 to conduct various image processing operations, which are essential for image formation; and image forming section 150 to conduct image formation, based on image forming orders and necessary image data.

As shown in FIG. 3, control section 101 is structured of:

display control section 1011 to control a display screen in operation display section 105;

connection control section 1012 to check and obtain connecting conditions, connecting positions, and apparatus information, of the tandem image forming apparatuses; and image formation control section 1013 to control image formation.

Operation display section 105 is configured of a display section which conducts typical displays, in accordance with the connecting positions of the image forming apparatuses in the image forming system, by a display control conducted by display control section 1011. Further, operation display section 105 is configured of an operating section which informs information for the screen operation to control section 101, when the user conducts a screen operation for a displayed image, and said operating section informs a key code to control section 101, when the user presses a hard key (which is not illustrated), such as a ten-key or a copy button.

Intermediate finishing device 200 is structured of:

control section 201 to control various sections of intermediate finishing device 200;

communication section 202 to communicate with image forming apparatuses 100 and 300; and intermediate finishing section 205 to reverse a recording sheet, so that after the recording sheet receives an image at image forming apparatus 100, serving as a pre-positioned image forming apparatus, the recording sheet is reversed, and is introduced to image forming apparatus 300 to receive a next image.

In case that intermediate finishing section 205 is directly operated by a control conducted by image forming apparatus 100, control section 201 can be skipped.

Image forming apparatus 300 is structured of:

control section 301 to control various sections of image forming apparatus 300;

communication section 302 to communicate with other connected devices;

operation display section 305 to receive indications inputted by a user and to display conditions of image forming apparatus 300;

memory section 330 to store image data for image formation, and to store various other data;

image processing section 340 to conduct various image processing operations, being necessary for the image formation; and image forming section 350 to conduct image formation, based on image forming orders and necessary image data.

As shown in FIG. 3, control section 301 is structured of:

display control section 3011 to control a display screen in operation display section 305;

connection control section 3012 to check and obtain connecting conditions, connecting positions, and apparatus information, of the tandem-combined image forming apparatuses; and image formation control section 3013 to control image formation.

Operation display section 305 is configured of a display section which conducts typical displays, in accordance with the connecting positions of the image forming apparatuses in the image forming system, by a display control conducted by display control section 3011. Further, operation display section 305 is configured of an operating section which informs information for the screen operation to control section 301, when the user conducts a screen operation for a displayed image, and said operating section informs a key code to control section 301, when the user presses a hard key (which is not illustrated), such as a ten-key or a copy button.

Post finishing device 400 is structured of:

control section 401 to control various sections of post finishing device 400;

communication section 402 to communicate with each apparatus and each device; and post finishing section 405 to conduct various post finishing operations (such as a punching process, a stapling process, and a binding process), onto recording sheets on which the images have been printed by image forming apparatuses 100 and 300, based on a control of control section 401.

In case that post finishing section 405 is directly operated by a control conducted by image forming apparatus 100 or 300, control section 401 can be skipped.

Concerning the typical displays described above, listed are:

a typical display corresponding to the connecting positions of each image forming apparatus in the image forming system;

a display to receive a typical operation corresponding to the connecting positions of each image forming apparatus in the image forming system, or a suitable display to receive typical operations;

a display concerning sheet supplying operations in the pre-positioned image forming apparatus in the image forming system;

a display concerning sheet ejecting operations in the post-positioned image forming apparatus in the image forming system, or a display concerning the post finishing process; and a display to complement the typical display concerning other image forming apparatuses in the image forming system.

[Operations of Image Forming Apparatus and Image Forming System]

Figure 4:
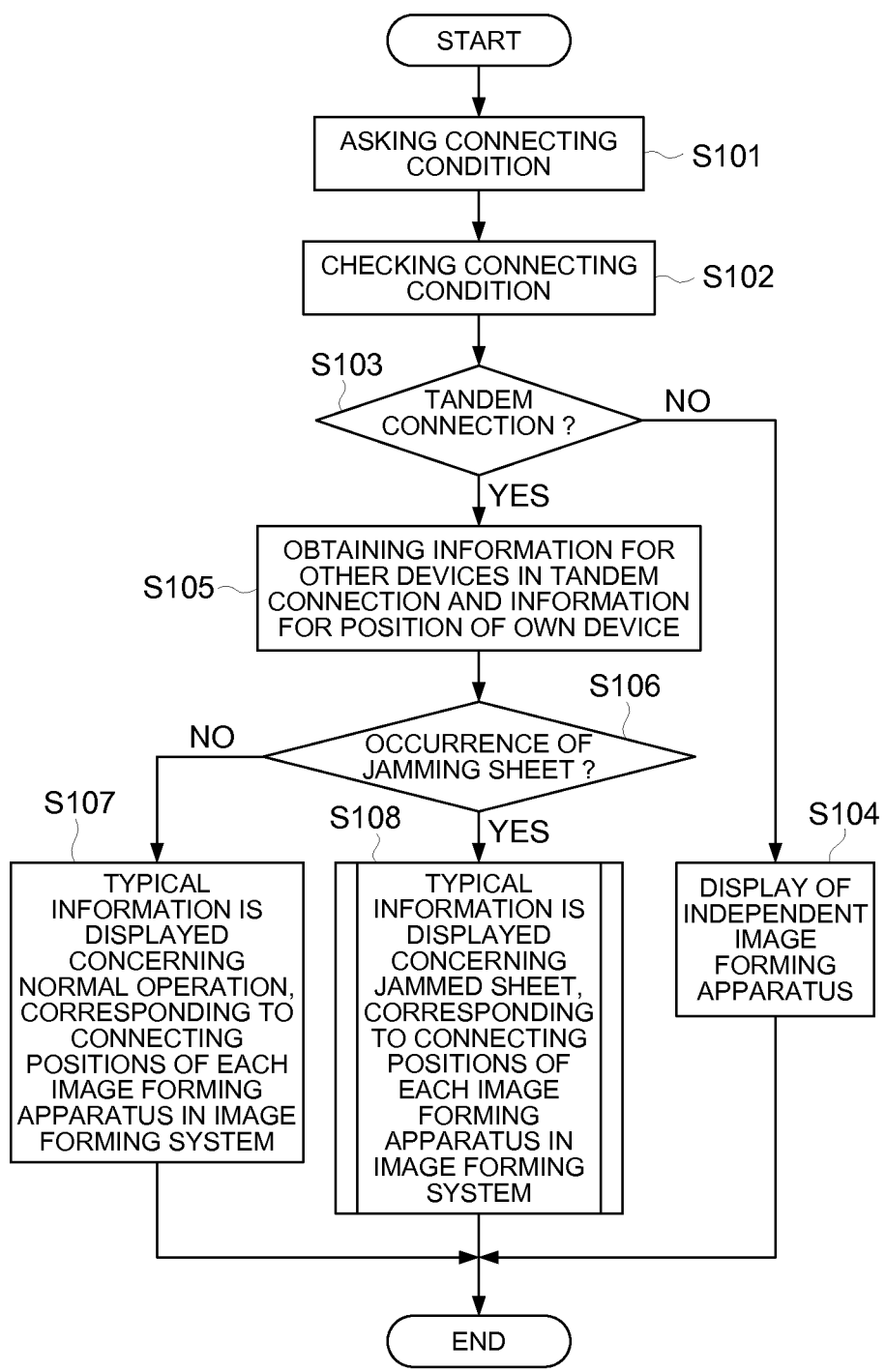
FIG. 4 is a flowchart to show operation of the image forming apparatus relating to the embodiment of the present invention.
Figure 5:
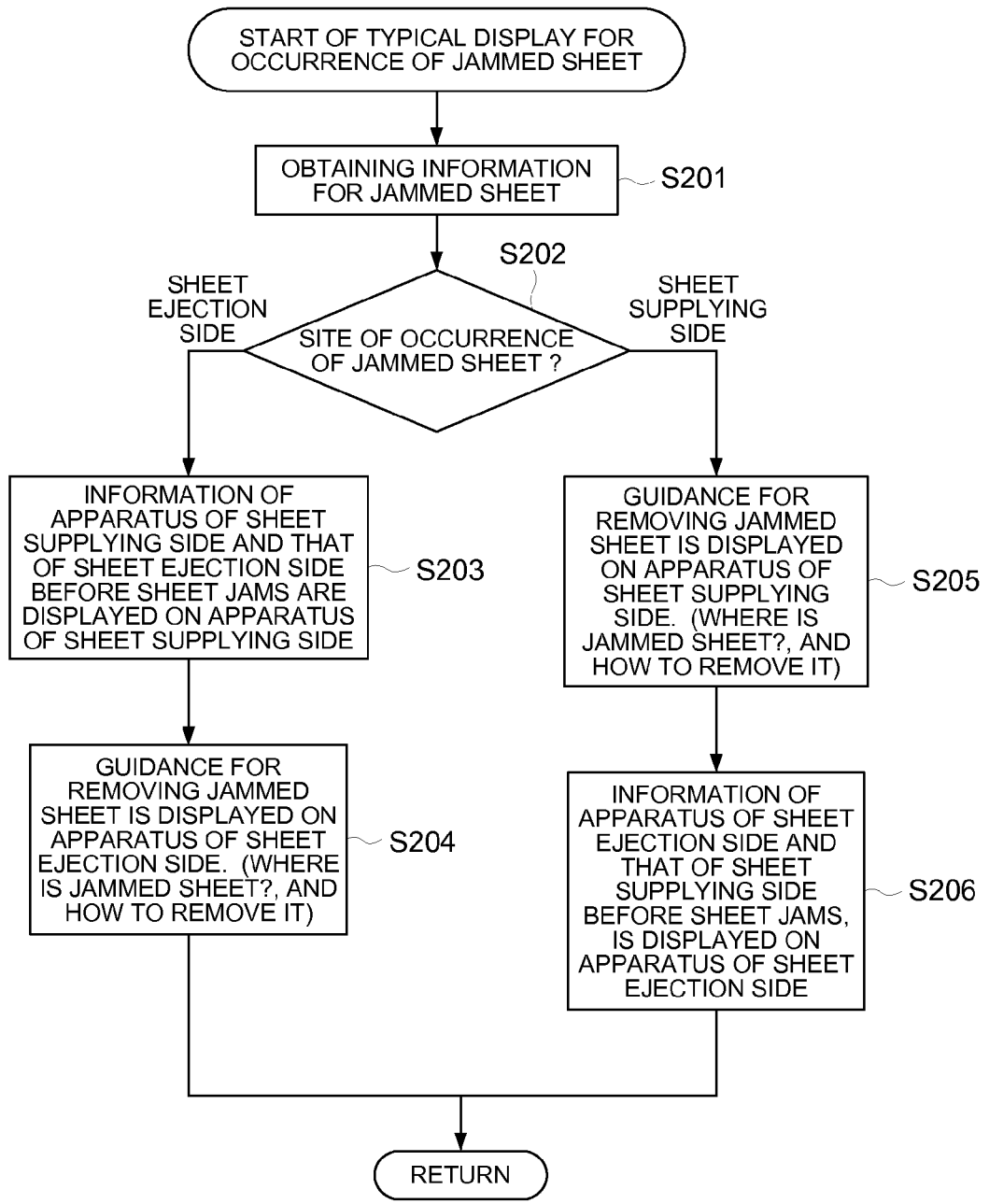
FIG. 5 is another flowchart to show operations of the image forming apparatus relating to the embodiment of the present invention.
Figure 6:
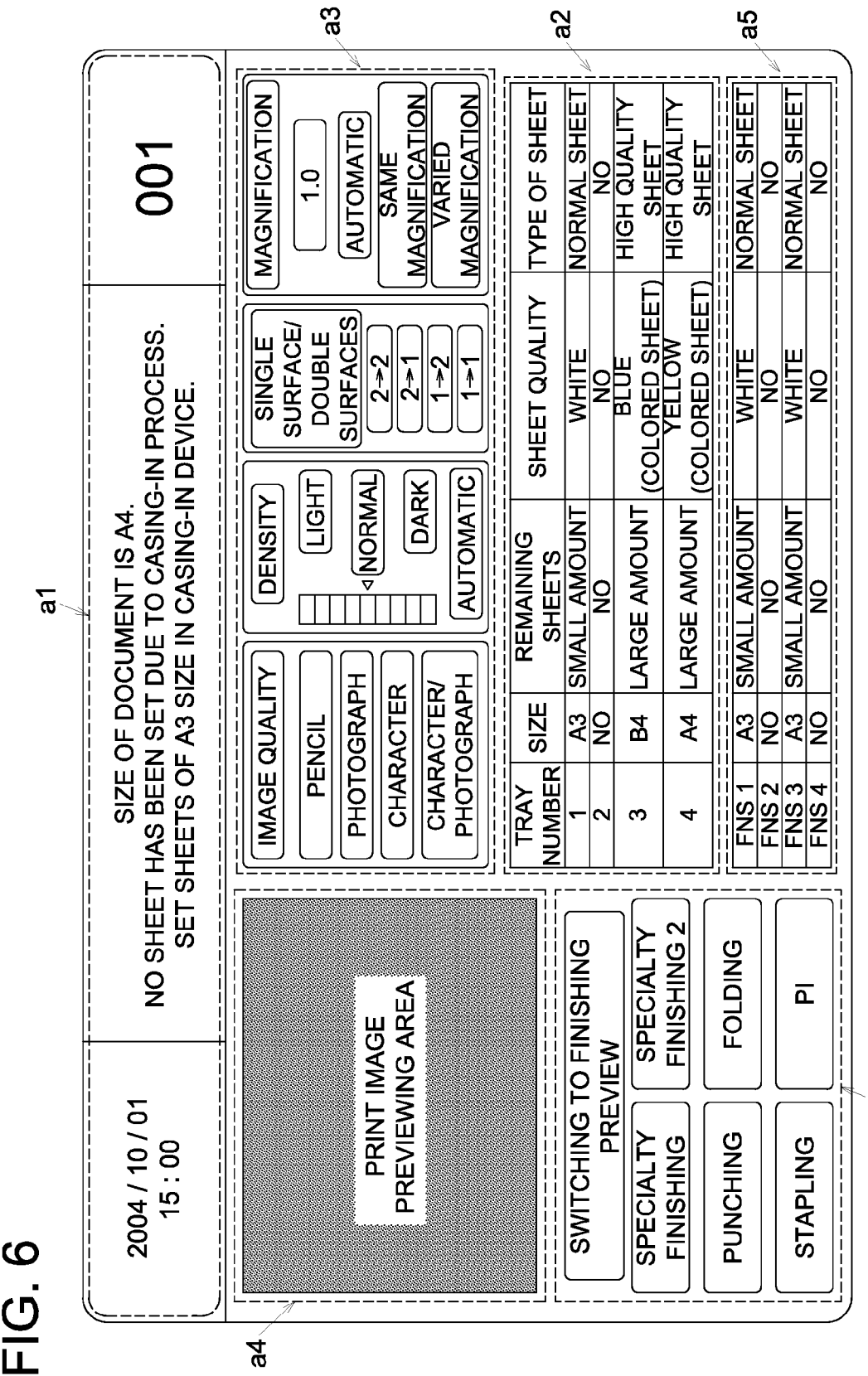
FIG. 6 shows an example of an image display, shown by the image forming apparatus relating to the embodiment of the present invention.

Operations of the embodiments of the image forming system will now be detailed, while referring to the flow-charts shown in FIGS. 4 and 5, and the screen displays shown in FIGS. 6 and 8.

Initially, when image forming apparatus 100 is combined with various members, such as sheet supplying device 50, intermediate finishing device 200, image forming apparatus 300, and post finishing device 400, connection control section 1012 in control section 101 asks the connecting conditions to the control sections of the various members (which is shown in step S101 in FIG. 4). To connection control section 1012, the control sections of each member send information for showing what kind of device it is, and also send connecting information concerning the connecting condition showing what devices are combined with its input portion and output portion. Since connectors of each communicating section of the members have been connected with each other, and since a sheet input portion and a sheet output portion are mechanically connected with each other, it is possible to recognize which member is combined with its input portion or output portion. Connection control section 1012 receives the answers from each member, and obtains information concerning the connecting conditions (which is shown in step S102 in FIG. 4).

In the same way as for the above members, when image forming apparatus 300 is combined with various members, such as sheet supplying device 50, intermediate finishing device 200, image forming apparatus 100, and post finishing device 400, connection control section 3012 in control section 301 asks the connecting conditions to the control sections of the various members (which is shown in step S101 in FIG. 4). To connection control section 3012, the control section of each member answers device information for showing what kind of device it is, and also answers connecting information concerning the connecting condition showing which members are combined with its input portion and output portion. Connection control section 3012 receives the answers from each connected member, and obtains information concerning the connecting conditions (which is shown in step S102 in FIG. 4).

While referring to information for the connecting conditions, connecting control section 1012 determines whether image forming apparatus 100 is tandemly-connected with image forming apparatus 300 or not (which is step S103 in FIG. 4). In the same way as above, while referring to information for the connecting condition, connecting control section 3012 determines whether image forming apparatus 300 is tandemly-connected with image forming apparatus 100 or not (which is also step S103 in FIG. 4). In detail, to be tandemly-connected with or not can be determined by only information for machine type about information the connecting condition.

If connecting control section 1012 determines that image forming apparatus 100 is not tandemly-connected with image forming apparatus 300 (which is "NO" of step S103 in FIG. 4), display control section 1011 controls operation display section 105 to display an independent image forming apparatus (which is shown by FIG. 6) (which is step S104 in FIG. 4).

A display showing the independent image forming apparatus is displayed when other image forming apparatuses, such as image forming apparatus 300, are not connected, even though sheet supplying device 50 and post finishing device 400 are connected within a system. That is, said display is used to receive operations for an image forming system led by image forming apparatus 100, and the display screen of which is illustrated in FIG. 6.

In the display screen of the independent image forming apparatus shown in FIG. 6, displayed are a display column for various messages (being a1 of FIG. 6), a display column for information for sheet supplying trays (being a2 of FIG. 6), a display column for information for various image processing conditions, such as image quality, density, image forming surface, and magnification of image formation (being a3 of FIG. 6), a display column for information for a pre-viewed image of a forming image (being a4 of FIG. 6), a display column for information for sheet supplying trays for the post finishing operation (being a5 of FIG. 6), and a display column for setting information for the post finishing operations, such as a hole punching operation, a sheet stapling operation, and a sheet folding operation. In addition, if a recording sheet jams at any portion of the conveyance path, display control section 1011 displays a sheet jam, as a predetermined display, on this display screen, which is not illustrated in FIG. 6.

If connecting control section 1012 determines that image forming apparatus 100 is tandemly-connected to image forming apparatus 300 (which is "YES" of step S103 in FIG. 4), connection control section 1012 refers to the answers from various devices, and extracts detailed information, such as the connecting positions of various devices, processing functions of various devices, information for their mounted trays and the size of the accommodated recording sheets, and information for the existence or non-existence of the recording sheets in the tray.

In the same way as above, if connection control section 3012 determines that image forming apparatus 300 is tandemly-connected with image forming apparatus 100 (which is "YES" of step S103 in FIG. 4), connection control section 3012 refers to the answers from various devices, and extracts various information, such as the connecting positions of various devices, processing functions of various devices, information for their mounted trays and the size of the accommodated recording sheets, and information for the existence or non-existence of the recording sheets on the tray (which is step S105 in FIG. 4).

In the above explanation, connection control section 1012 extracts said detailed information (step S105 in FIG. 4), while referring to the answers for the tandem-connecting condition (step S101 in FIG. 4). However, as another method, determination of the tandem-connecting condition and extraction of information for the various devices can be conducted individually.

At this moment, if a jammed sheet is not detected in the other devices via connection control section 1012, and if a jammed sheet is not detected in image forming apparatus 100 by image formation control section 1013 (which is "NO" in step S106 in FIG. 4), display control section 1011 controls operation display section 105 to display typical information for the normal condition regarding the connecting position of each image forming apparatus in the image forming system using the serial tandem method (step S107 in FIG. 4).

Figure 7A:
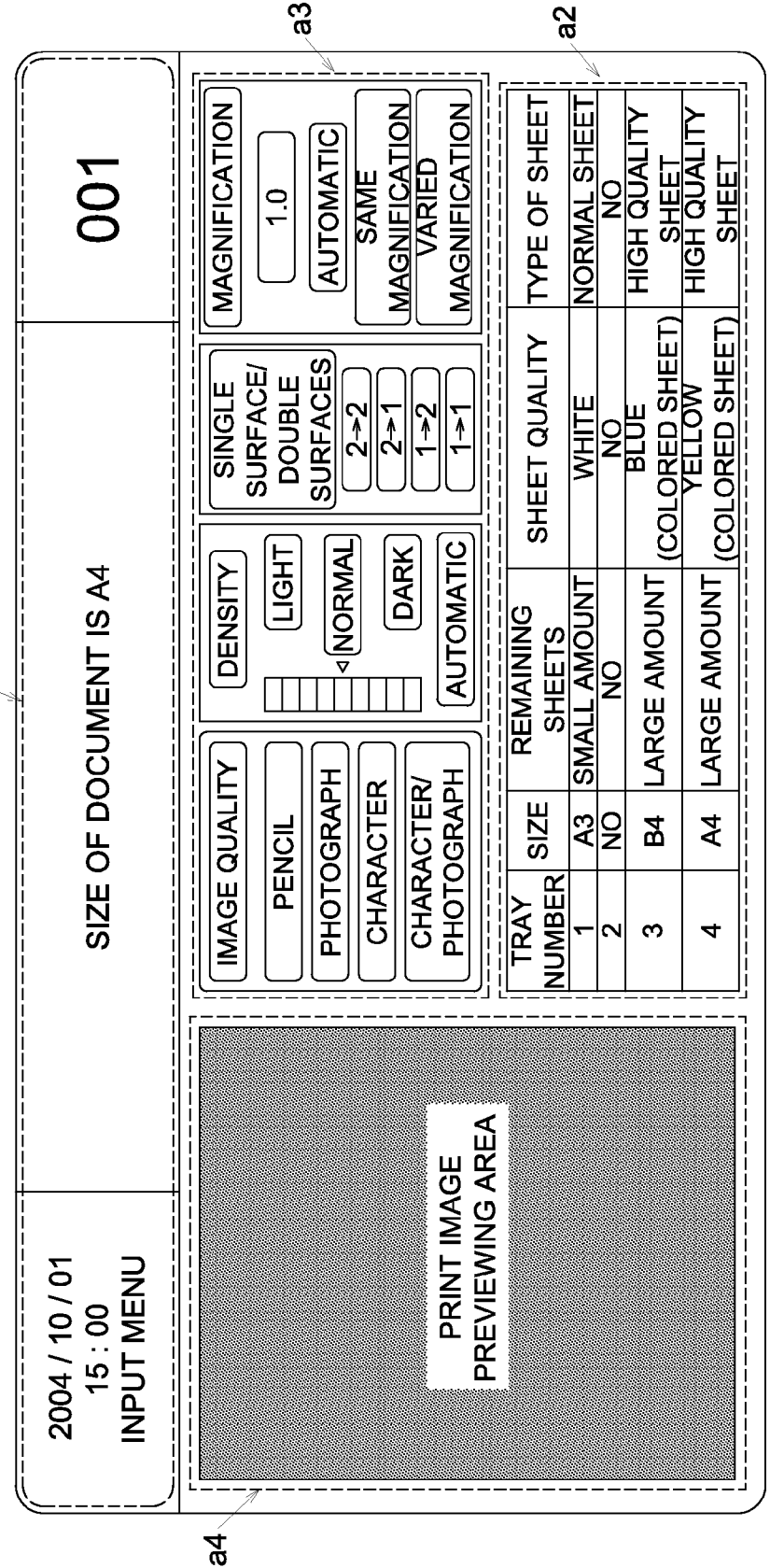

Image forming apparatus 100 is arranged upstream of image forming apparatus 300 in the image forming system using the serial tandem method, that is, image forming apparatus 100 is arranged at a sheet supplying side of image forming apparatus 300, whereby display control section 1011 controls operation display section 105 to display information shown in FIG. 7a, which display is suitable to receive a typical operation, corresponding to a connecting position which is on the sheet supplying side, being the upstream side.

In display screen G1, shown in FIG. 7a, for the image forming apparatus positioned upstream in the image forming system using the serial tandem method, displayed are a display column for various messages (being "a1" of FIG. 7a), a display column for information for sheet supplying trays (being a2 of FIG. 7a), a display column for information for various image processing conditions, such as image quality, density, image forming surface, and magnification of image formation (being a3 of FIG. 7a), and a display column for information for a pre-viewed image of a forming image (being a4 of FIG. 7a). However, in principle, no display regarding the post finishing operation is displayed, other than a complementary display to be detailed later. As a result, conditions of image forming apparatus 100 in the image forming system using the serial tandem method can be easily obtained, and the image forming system can be controlled in a more operable condition.

In the same way as above, if a jammed sheet is not detected in the other devices via connection control section 3012, and if a jammed sheet is not detected in image forming apparatus 300 by image formation control section 3013 (which is "NO" in step S106 in FIG. 4), display control section 3011 controls operation display section 305 to display typical information for the normal condition regarding the connecting position of each image forming apparatus in the image forming system using the serial tandem method (step S107 in FIG. 4).

Further, image forming apparatus 300 is arranged downstream of image forming apparatus 100 in the image forming system using the serial tandem method, that is, image forming apparatus 300 is arranged at the sheet ejection side of image forming apparatus 100, whereby display control section 3011 controls operation display section 305 to display information shown in FIG. 7*b*, which display is suitable to receive a typical operation, corresponding to a connecting position which is on the sheet ejection side, being the downstream side.

In display screen G2, shown in FIG. 7*b*, for the image forming apparatus positioned downstream in the image forming system using the serial tandem method, displayed are a display column for various messages (being b1 of FIG. 7*b*), a display column for information for sheet supplying trays (being b2 of FIG. 7*b*), a display column for information for various image processing conditions, such as image quality, density, image forming surface, and magnification of image formation (being b3 of FIG. 7*b*), and a display column for post finishing pre-view information (being b4 of FIG. 7*b*). However, in principle, no display regarding the sheet trays of sheet supplying device 50 is displayed, other than a complementary display to be detailed later.

Further, the above description concerns that post finishing device 400 has been arranged downstream of image forming apparatus 300. However, if plural sheet ejection trays have been arranged instead of post finishing device 400, detailed information for the sheet ejection tray are displayed. As a result, conditions of image forming apparatus 300 in the image forming system using the serial tandem method can be easily obtained, and the image forming system can be controlled in a more operable condition.

At this moment, if a jammed sheet has been detected at any point in the image forming system (which is "YES" in step S106 in FIG. 4), display control section 1011 controls operation display section 105 to display typical information for the jammed sheet regarding the connecting position of each image forming apparatus in the image forming system using the serial tandem method (step S108 in FIG. 4), which will be detailed later, referring to FIG. 5. In the same way, display control section 3011 controls operation display section 305 to display typical information for the jammed sheet, corresponding to a connecting position of each image forming apparatus in the image forming system, using the serial tandem method (step S108 in FIG. 4).

First, display control section 1011 obtains information for jammed sheet from image formation control section 1013 and connection control section 1012 (step S201 in FIG. 5). Said information for the jammed sheet includes various information, such as, where and how the jam occurs, and how to release it.

In image forming apparatus 100, if jamming of a recording sheet is detected in image forming apparatus 300 or in sheet ejection device 400, via connection control section 1012 (being on the sheet ejection side in step S202 in FIG. 5), display control section 1011 controls operation display section 105 to display typical information, which is suitable for receiving typical operations corresponding with a connecting position of the sheet supplying side, being the upstream side, which display is a typical display for a jammed sheet corresponding with a connecting position (at which a sheet does not jam) of image forming apparatus 100, in the image forming system, using the serial tandem method, and display control section 1011 controls operation display section 105 to display information to complement the typical display for image forming apparatus 300 in the image forming system (step S203 in FIG. 5). Said complementary display includes a display, which is displayed before occurrence of a sheet jam in image forming apparatus 300. Further, in order to display said complementary display, display control section 1011 obtains necessary information for displaying the complementary display, from display control section 3011.

Figure 8A:
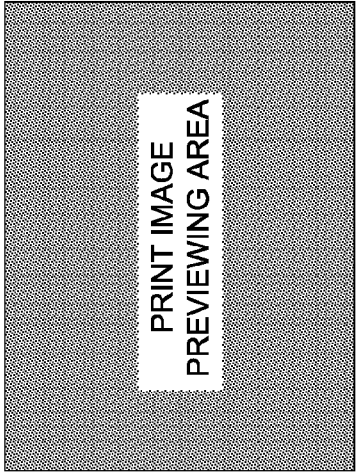
FIGS. 8a and 8b show other examples of the image display, shown by the image forming apparatus relating to the embodiment of the present invention.

On display screen G1', shown in FIG. 8*a*, for the image forming apparatus positioned upstream in the image forming system using the serial tandem method, displayed are a display column for various messages (being a1 of FIG. 8*a*), a display column for information for sheet supplying trays (being a2 of FIG. 8*a*), a display column for information for various image processing conditions, such as image quality, density, image forming surface, and magnification of image formation (being a3 of FIG. 8*a*), and a display column for information for a pre-viewed image of the formed image (being a4 of FIG. 8*a*). Further, as a display for complementing image forming apparatus 300, which is arranged at the downstream side, and carrying a jammed sheet, displayed are a display column for information for the sheet trays of the post finishing device (ab5 of FIG. 8*a*, which corresponds to b2 of FIG. 7*b*), and a column for displaying information for setting the post finishing device, such as hole punching, sheet stapling, and sheet folding (ab6 of FIG. 8*a*, which corresponds to b3 of FIG. 7*b*).

Further, if a jammed sheet is detected in post finishing device 400 via connection control section 3012, or if a jammed sheet has been detected in image forming apparatus 300 by image formation control section 3013 (which is on the sheet ejection side in step S202 in FIG. 5), display control section 3011 controls operation display section 305 to display typical information for the jammed sheet, corresponding to the connecting position (which is the position of the jammed sheet) of image forming apparatus 300 in the image forming system, using the serial tandem method (step S204 in FIG. 5). Still further, in order to display guidance for removing the jammed sheet, display control section 3011 transfers necessary information to display control section 1011, so that image forming apparatus 100, instead of image forming apparatus 300, is able to complementarily display information for the post finishing operation.

Figure 8B:
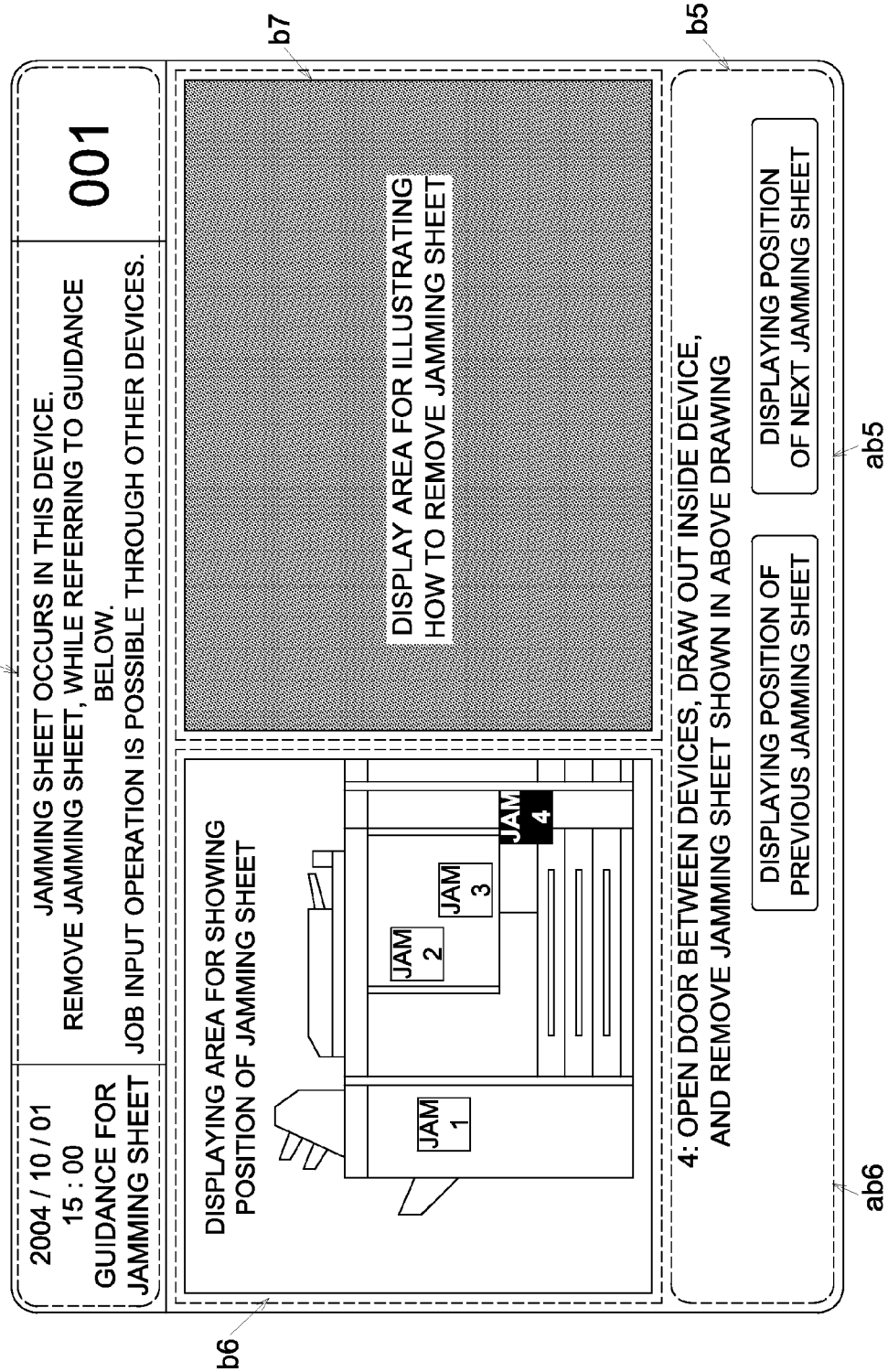

On display screen G2', shown in FIG. 8*b*, for the image forming apparatus positioned on the downstream side in the image forming system using the serial tandem method, displayed are a display column for various messages (being b1 of FIG. 8*b*), a display column for a guidance message for removing a jammed sheet (b5 of FIG. 8*b*), a display column for illustrating the position of the jammed sheet (b6 of FIG. 8*b*), and a display column for illustrating procedures for removing the jammed sheet, whereby information for the post finishing operations is not displayed at this time.

Accordingly, in the image forming system using the serial tandem method, image forming apparatus 300, carrying a jammed sheet, can effectively display guidance for removing the jammed sheet, as a typical display. Further, image forming apparatus 100 can display necessary information of image forming apparatus 300, carrying a jammed sheet, whereby image forming apparatus 100 can be aware of all the conditions of the image forming system, and the image forming system can be controlled in a more operable condition.

Further, if a jammed sheet is detected in sheet supplying device 50 via connection control section 1012, or if a jammed sheet has been detected in image forming apparatus 100 by image formation control section 1013, display control section 1011 controls operation display section 105 to display typical information for an occurring condition of the jammed sheet, corresponding to the connecting position (which is a position of a sheet jamming side) of image forming apparatus 100 in the image forming system, using the serial tandem method (step S205 in FIG. 5). Still further, in order to mainly display guidance for removing a jammed sheet, display control section 1011 transfers necessary information to display control section 3011, so that image forming apparatus 300, instead of image forming apparatus 100, is able to display complementary information for the sheet supplying operation and the image forming condition.

In image forming apparatus 300, if a jam of a recording sheet is detected in image forming apparatus 100 or in sheet supplying device 50, via connection control section 1012 (being on the sheet supplying side in step S202 in FIG. 5), display control section 3011 controls operation display section 305 to display typical information, which is suitable for receiving typical operations corresponding with a connecting position of the sheet ejection side, being the downstream side, which information is typical for a jammed sheet corresponding with a connecting position (at which a sheet does not jam) of image forming apparatus 300, in the image forming system, using the serial tandem method, and display control section 1011 controls operation display section 305 to display information to complement a typical display for image forming apparatus 100 in the image forming system (step S206 in FIG. 5). Said complementary display includes a display, which has been displayed before the sheet jammed in image forming apparatus 100. Further, in order to display said complementary display, display control section 3011 obtains necessary information for displaying the complementary display, from display control section 1011.

Accordingly, in the image forming system using the serial tandem method, image forming apparatus 100, carrying a jammed sheet, can effectively display guidance for removing the jammed sheet, as a typical display. Further, image forming apparatus 300 can display necessary information of image forming apparatus 100, carrying a jammed sheet, whereby image forming apparatus 300 can be aware of the total conditions of the image forming system, and the image forming system can be controlled in a more operable condition.

Further, if a jam occurs in intermediate finishing device 200, one of image forming apparatus 100 or image forming apparatus 300 is controlled to display information for the jammed sheet and the removing guidance, while another apparatus is controlled to display complementary information, because intermediate finishing device 200 is arranged between images forming apparatus 100 and image forming apparatus 300.

Another Embodiment (1)

The above explanations, concerning the displays for a jammed sheet and the removing procedures of the jammed sheet, and concerning the display for complementing the other apparatus, are applicable on various conditions in which the apparatuses are controlled to stop, and necessary information is required. That is, said conditions include machine cleaning, maintenance, checking, changing, replenishment of toner, replenishment of recording sheets, replenishment of staples, and a full sheet ejection tray.

Another Embodiment (2)

The above embodiment concerns the image forming apparatuses using the electro-photographic method. However, the above embodiments can be used for various image forming systems using the serial tandem method, even if said systems use a method other than the electro-photographic method.

Further, not only the same type of apparatuses, but also similar apparatuses being able to combine with each other, can be structured to be an image forming system using the serial tandem method.

The effects of embodiments of the present invention are detailed below.

(1) In the image forming system using the serial tandem method, the display sections are controlled to display the typical display corresponding to the connecting positions of each image forming apparatus in the image forming system. Accordingly, the conditions of each image forming apparatus using the serial tandem method can be easily understood by the user, so that the system can be controlled in a more operable condition.

(2) The display section is controlled to display information for receiving a typical operation, corresponding to the connecting positions of each image forming apparatus in the image forming system. Accordingly, the conditions of each image forming apparatus using the serial tandem method can be easily understood by the user, so that the system can be controlled in a more operable condition.

(3) The control section communicates with the control section of another image forming apparatus in the image forming system, so that the connecting position of each image forming apparatus in the image forming system can be detected, and the display section displays typical information, based on the detected connecting position, whereby the conditions of each image forming apparatus using the serial tandem method can be easily understood by the user, so that the system can be controlled in a more operable condition.

(4) As a typical display, the upstream image forming apparatus displays sheet supplying information, the downstream image forming apparatus displays information for the sheet ejection or the post finishing operation, whereby the conditions of each image forming apparatus using the serial tandem method can be easily understood by the user, so that the system can be controlled in a more operable condition.

(5) Complementary information is displayed for another image forming apparatus in the image forming system, whereby the conditions of each image forming apparatus using the serial tandem method can be easily understood by the user, so that the system can be controlled in a more operable condition.

What is claimed is:
1. An image forming system comprising:
 a plurality of image forming apparatuses which are tandem-arranged in series, and which form an image on areas of a same recording sheet which are respectively assigned to the plurality of image forming apparatuses, the plurality of image forming apparatuses being tandem-arranged in series along a conveying route of the recording sheet, wherein each image forming apparatus of the plurality of image forming apparatuses comprises:

a display which is configured to display various information; and a processor which is configured to control the display to display information concerning the image forming system, wherein the information concerning the image forming system is information collected based on a connecting position of each image forming apparatus in the tandem arrangement in series along the conveying route of the recording sheet, and wherein the processors from each image forming apparatus of the plurality of image forming apparatuses share information relating to the image forming system with each other and cause the display of each image forming apparatus of the plurality of image forming apparatuses to display the information concerning the image forming system based on the shared information.

2. The image forming system of claim 1, wherein the processor is configured to control the display to display information for receiving a typical operation corresponding to the connecting position of each image forming apparatus of the plurality of image forming apparatuses in the image forming system.

3. The image forming system of claim 1, wherein the processor is configured to detect the connecting position of each image forming apparatus of the plurality of image forming apparatuses, and wherein the processor is configured to control the display to display typical information corresponding to detected results.

4. The image forming system of claim 1, wherein the processor is configured to control the display to display typical information corresponding to whether each image forming apparatus of the plurality of image forming apparatuses is arranged at an upstream side or a downstream side in the image forming system.

5. The image forming system of claim 4, wherein the processor of the image forming apparatus arranged at the upstream side is configured to control the display to display information for a sheet supplying operation, and wherein the processor of the image forming apparatus arranged at the downstream side is configured to control the display to display information for a sheet ejection operation or information for a post finishing operation.

6. The image forming system of claim 1, wherein the processor is configured to control the display to display information for complementing typical information of another image forming apparatus in the image forming system.

7. The image forming system of claim 1, wherein the processors from each image forming apparatus of the plurality of image forming apparatuses cause the displays to display information relating to another one of the image forming apparatuses.

8. An image forming system comprising:

a plurality of image forming apparatuses which are tandem-arranged in series, and which form an image on areas of a same recording sheet which are respectively assigned to the plurality of image forming apparatuses, the plurality of image forming apparatuses being tandem-arranged in series along a conveying route of the recording sheet, wherein each image forming apparatus of the plurality of image forming apparatuses comprises:

a display which is configured to display various information; and control means for controlling the display to display information concerning the image forming system, wherein the information concerning the image forming system is information collected based on a connecting position of each image forming apparatus in the tandem arrangement in series along the conveying route of the recording sheet, and wherein the control means from each image forming apparatus of the plurality of image forming apparatuses share information relating to the image forming system with each other and cause the display of each image forming apparatus of the plurality of image forming apparatuses to display the information concerning the image forming system based on the shared information.

9. The image forming system of claim 8, wherein the control means is configured to control the display to display information for receiving a typical operation corresponding to the connecting position of each image forming apparatus of the plurality of image forming apparatuses in the image forming system.

10. The image forming system of claim 8, wherein the control means is configured to detect the connecting position of each image forming apparatus of the plurality of image forming apparatuses, and wherein the control means is configured to control the display to display typical information corresponding to detected results.

11. The image forming system of claim 8, wherein the control means is configured to control the display to display typical information corresponding to whether each image forming apparatus of the plurality of image forming apparatuses is arranged at an upstream side or a downstream side in the image forming system.

12. The image forming system of claim 11, wherein the control means of the image forming apparatus arranged at the upstream side is configured to control the display to display information for a sheet supplying operation, and wherein the control means of the image forming apparatus arranged at the downstream side is configured to control the display to display information for a sheet ejection operation or information for a post finishing operation.

13. The image forming system of claim 8, wherein the control means is configured to control the display to display information for complementing typical information of another image forming apparatus in the image forming system.

14. The image forming system of claim 8, wherein the control means from each image forming apparatus of the plurality of image forming apparatuses cause the displays to display information relating to another one of the image forming apparatuses.

* * * * *